United States Patent [19]
Apple et al.

[11] 3,811,756
[45] May 21, 1974

[54] DUAL IMAGE REFRACTION TESTING DEVICE

[76] Inventors: Willis J. Apple, 1202 Orlanda Ave., Memphis, Tenn. 33505; Wendell W. Anderson, 821 S. Park Ave., Memphis, Tenn. 62948

[22] Filed: Dec. 7, 1972

[21] Appl. No.: 312,879

[52] U.S. Cl. .................. 351/17, 350/31, 351/26
[51] Int. Cl. ..................... A61b 3/02, G02b 21/18
[58] Field of Search ........ 350/145, 146, 31; 351/17, 351/25, 26, 28

[56] References Cited
FOREIGN PATENTS OR APPLICATIONS
896,127  10/1953  Germany .......................... 350/146

OTHER PUBLICATIONS
Daniels, "The Zeiss Simultantest," The Optician, Vol. 156, No. 4034, pp. 83-85, 7-26-68.

*Primary Examiner*—Paul A. Sacher
*Attorney, Agent, or Firm*—James David Haynes

[57] ABSTRACT

A device for receiving light from a single source and producing two parallel image outputs having equal intensity. Totally reflective mirrors receive light from the source through lenses and reflect the respective images to emerge from the device at approximately 8 millimeters separation. One lens is mounted in each light path and a third lens is rotatably mounted for alternate use in conjunction therewith whereby both images may be presented through spherical lenses or cross cylinder lenses depending upon the position of the third lens. The lenses and reflective mirrors may be rotated to permit examination of an eye for oblique astigmatism.

6 Claims, 5 Drawing Figures

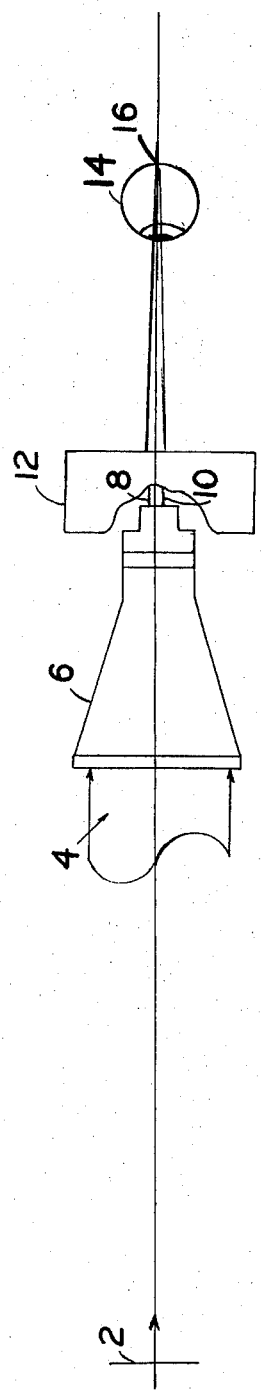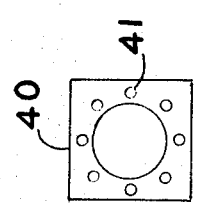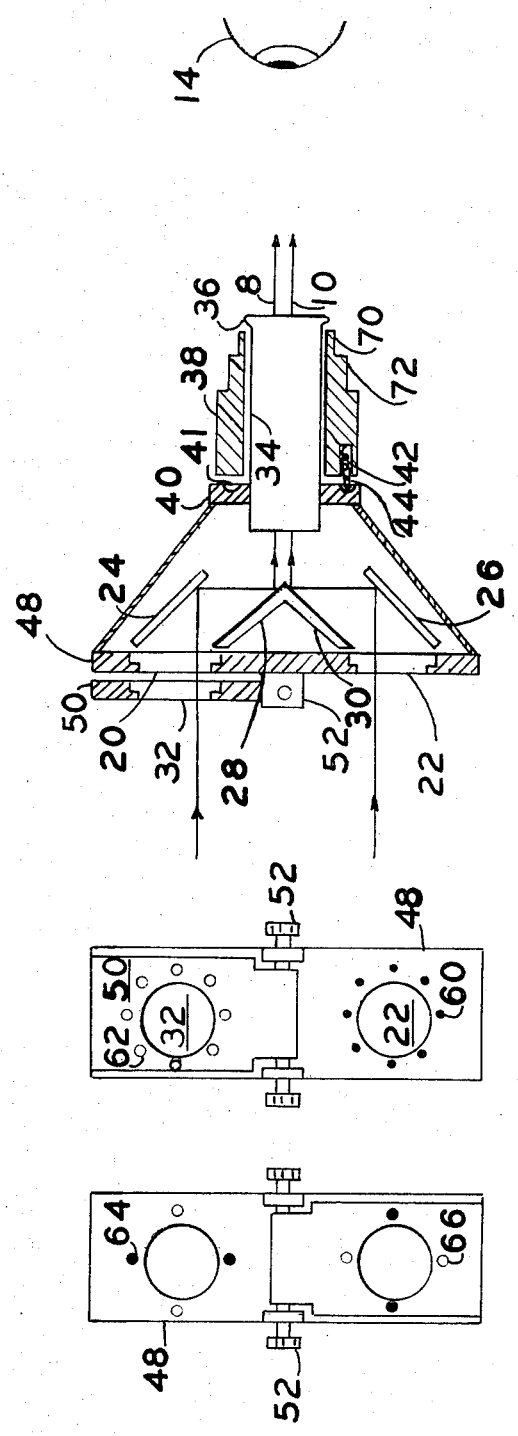

DUAL IMAGE REFRACTION TESTING DEVICE

BACKGROUND OF THE INVENTION

The present invention relates to improvements in optometric instruments and more particularly to apparatus for subjective eye examinations. There is a need for a device or means whereby the human eye may be examined to ascertain the exact spherical or astigmatic correction necessary to enable the eye to function normally, that is, to properly focus as a normal eye having no distortions or abberations. Numerous devices have been generated in an effort to make the system of eye examination simple and expedicious. An instrument designed to this end and existent in virtually its present form for many years is the phoroptor. Two well known models are the Bausch and Lomb Green's phoroptor and the American Optical Ultra-matic phoroptor. Both work similarly and present different lens before the eye and permit the patient to relate to the examiner the clarity with which a different image is viewed. The patient actually compares, in sequence, the image he sees with a first lens and then a second lens, subjectively determining which image has the best resolution. Through an interchange of questions and subjective analyzation on the part of the patient, the ultimate corrective lens is choosen. Several systems for conducting this examination are adequately related in U.S. Pat. No. 3,240,548, *Optical System for Determining Eye Characteristics* by Biessels. That patent discloses a device which presents to a patient two substantially coterminous images focused thru lens having different corrective dioptic powers. The patient, viewing both images simultaneously, must choose which lens system provides the optimum visual acuity. The patient's ability to judge which lens combination provides optimum visual acuity is of critical importance and the flaw in any subjective system. While the device disclosed in Bissels sought to eliminate this subjective element as near as practicable, in practice the device does not accomplish this result. The device is confusing to the operator and the patient in actual use and has been virtually abandoned by practitioners. Since the images are seen simultaneously by the patient (image separation of approximately ⅔ prism diopters), the image areas actually overlap because of the size of the chart necessarily displayed to the patient. The problem is even more acute when determining refractive error in aphakia or sub-normal vision patients which requires large acuity materials to be displayed to the patient. The small separation is especially undesirable when the device is positioned to display the test images side by side. This causes an illusion to the patient and consequently results in the patient's inability to select the real image having optimum visual acuity. Further, since the Biessels device reverses the images (top to bottom), the operator must remember that should the patient say top, he in reality means bottom. While the patent teaches that the images presented to the patient may be made to have the same intensity, no structure has been developed for so doing, nor have the present inventors been successful in their attempts to do so.

Accordingly, it is an object of this invention to provide a device whereby two images of equal intensity are presented to the patient through lens of different dioptric power in close proximity to one another whereby the patient can view successively the images and thus determine which image offers the best visual acuity.

It is also an object of this invention to present the images to the eye physically (top and bottom) in relationship to the lens through which the images are developed.

A further object of the present invention is to provide a device which may be used with the Bausch and Lomb or American Optical phoroptors without the need of expensive adapters.

Yet another object of the present invention is to provide a structure that is rotatable to permit examination of the eye for oblique astigmatism.

SUMMARY OF THE INVENTION

The dual image refraction testing device is positioned between a phoroptor and the image being viewed by a patient. Totally reflective devices divide the light from the image into two identical parallel image outputs having equal intensity. The outputs enter the phoroptor to be presented to the eye of the patient whereby the patient is permitted to view the images in close succession with minimum eye movement to subjectively determine which image offers the best visual acuity. The device is designed to mate with known phoroptors and may be rotated together with or relative to the phoroptor to enable examination for oblique astigmatism. The operator may present images for astigmatic or spherical testing by simply flipping a lens from position one to position two, the same lens being used in both examination processes.

BRIEF DESCRIPTION OF THE DRAWINGS

FIG. 1 is a schematic diagram of the present invention mated with a phoroptor and positioned between a light source and a patient's eye;

FIG. 2 shows the present invention, partially in cross section;

FIG. 3 is a diagrammatic view of back plate 40 disclosed in FIG. 2; and

FIGS. 4 and 5 are diagrammatic views of face plate 48 and flipper 50 with flipper 50 in position 1 and position 2 respectively.

DESCRIPTION OF THE PREFERRED EMBODIMENT

Referring to FIG. 1, light emanating from image source 2 evenly illuminates lens area 4 of testing device 6. Testing device 6 provides two image outputs 8 and 10 having equal intensity. Outputs 8 and 10 are directed through phoroptor 12 into eye 14 where they are brought to focus immediately before or after the retina 16. The separation of the images at the retina is approximately 0.50 diopters. Image paths 8 and 10 are substantially parallel as they emerge from testing device 6.

FIG. 2 discloses the internal structure of the present invention. Light entering the device through lens 20 impinges upon totally reflective mirror 24 and is reflected therefrom onto totally reflective mirror 28. The light is then reflected in the direction of the eye and emerges as output 8. The same general structure is involved in generating output 10. Light entering lens 22 is directed via mirrors 26 and 30 in the direction of the eye as disclosed in FIG. 1. Mirrors 24, 26, 28 and 30 are arranged to direct the image outputs from the device parallel and displaced one from the other by approximately 8 millimeters. The structure may be varied to obtain any desired image separation. Accordingly, the present device may be used to determine refractive error in aphakia or other sub-normal vision patients which requires the use of large acuity materials. The present device also enables presbyopic examination of any "near" test which would require the image to be viewed approximately 16 inches from the patient. The images may be viewed without overlap. The minimum separation is determined by the size of the chart displayed before the patient (image source 2 in FIG. 1) so that the images as seen by the patient will be separate and distinct and will not overlap to cause reinforcement of the light waves thus causing false optical impressions.

In order to test the eye for astigmatic or spherical errors various lenses 20 and 22 may be inserted having various dioptric powers and either spherical or cross cylindrical configurations. The present invention, by incorporating lens housing 50 (flipper) into the system, offers a convenient manner for examining spherical and astigmatic errors with a minimum of effort. Knob 52 provides a convenient means for directing said flipper.

In a preferred embodiment, lens 20 would be a true Jackson cross cylinder (− 0.25D and − 0.25D), lens 22 would be a spherical lens (− 0.25D spheres). Lens 32 is selected such that the combination of lens 32 and 20 provide a spherical lens with − 0.25D spheres and the combination of lens 32 and 22 provide an equivalent Jackson cross cylinder with opposite polarity to lens 20. Thus, in a first position shown in FIG. 2 and FIG. 4, the device would check for sphere. To check for cross cylinder (astigmatic) one need only rotate flipper 50 to position 2 (180°, FIG. 5) such that lens 32 aligns axially with lens 22 to provide a lens system constituting a standard Jackson cross cylinder in the viewing paths, each lens system having exactly opposite polarity. With the flipper in position 2 (FIG. 5), image outputs 8 and 10 are created through two cross cylinders with their axes 90° apart. This permits cylinder error to be located for both power and axis.

The methods established in the art for determining either cylinder or oblique astigmatism are well known. The present device incorporates into the system the same ability as aforementioned, that is, the ability to view two images and select the better image in the conduct of these methods. The present phoroptors are designed to provide for the test, however, they are not able to provide dual images for the patient to view. The present invention supplements the phoroptor and actually permits the operator to conduct the test by rotating the present device in conjunction with the cylinder in the phoroptor instead of rotating the Jackson cross cylinder lens on the phoroptor. In determining cylinder axis the operator may also rotate the device 45° to bracket the correcting cylinder axis in the phoroptor.

Cylindrical tubular member 34 is inserted through cylindrical tubular member 38 and is affixed to back plate 40. Member 38 rotates around member 34 and is biased against flange 36 by spring 42. Spring 42 forces plunger 44 against back plate 40. Proper alignment and stability between back plate 40, member 34 and member 38 is provided by properly machining members 34 and 38 and by proper adjustment of spring 42.

Referring now to FIG. 3, back plate 40 is shown to have plurality of positioning holes 41 within which plunger 44 aligns as member 38 is rotated. This alignment means permits the device to be aligned precisely at predetermined angular displacement to the phoroptor. Member 38 is mated with the phroptor and thus the above-described rotation causes the lenses to rotate in a plane parallel to the lens in the phoroptor. Since the eye remains in the same position, and since the lens structure may be rotated relative thereto, the eye may be presented with images passing through lenses having axes disposed at various angles as determined by the operator. As the lens structure is rotated so are the lens disposed therein and accordingly the axes of the lens rotate and position at 45°, 90°, 135°, etc. The lens within the phoroptor may likewise be rotated. The present device may be mated with the phoroptor at any desired rotational angle to provide any desired combination of axes. Normally the operator will align the axes of the lenses within the present device with the axes of the lens disposed within the phoroptor and this is accomplished by aligning a machined mark on the device with the axes of the phoroptor.

FIGS. 4 and 5 disclose markings used to denote sphere and cross cylinder. FIG. 4 discloses a novel means for denoting plus or minus sphere. In FIG. 4, solid dots 60 (red in practice) are used to indicate minus sphere while circles 62 (white in practice) are used to indicate plus sphere. FIG. 5 discloses standard markings used to denote cross cylinder. Persons skilled in the art may readily adapt to the use of the present invention and its means of notation, an advantage not offered by the Biessels device.

FIG. 5 discloses the present invention with the flipper arranged to display cross cylinders (position 2). Again, solid dots 64 are used to represent negative axis and the white dots 66 are used to indicate plus axis. Thus, the plus and minus axes are immediately apparent to the operator. Also, in the present invention, the patient and the operator are viewing the same relationship of lens to images apparent to the patient. The image apparent to the patient as "top" is being received by the present invention through the top lens and vice versa.

Member 38 is specifically designed to mate with the Bausch and Lomb Green's phoroptor and the American Optical Ultra-matic phoroptor, however, it is not intended to limit the use of the present invention by so doing. Referring to FIG. 2, member 38 has a first annular surface 70 and a second annular surface 72 whose dimensions permit the present invention to be mated with the eye well hole of the respective phoropters. Previous devices have required special adaptors for use with each machine thus increasing the price and the inarticulate manner in which they operated. When the operator attempted to rotate any portion of the device (such as Biessels) the adapter and the device would fall apart. The present invention is quickly mated with any phoroptor standard on the American market today and offers simplistic structure and operation to achieve precise results when examining the human eye.

We claim:

1. A dual image refraction testing device comprising totally reflective optical means for directing light emanating from a single source into first and second parallel image outputs of substantially equal intensity and lens means disposed between said source and said reflective optical means, said totally reflective optical means comprising means for producing said first image output and means for producing said second image output; said means for producing a first image output comprising first and second totally reflective devices, said first reflective device positioned to receive light through said lens means and reflect said light onto said second reflective device, said second reflective device positioned to direct said light from said dual image refraction testing device as a first image output; said means for producing a second image output comprising third and fourth totally reflective devices, said third reflective device positioned to receive light through said lens means and reflect said light onto said fourth reflective device, said fourth reflective device positioned to direct said light from said dual image refraction testing device parallel to said first image output, said reflective means and said lens means providing two images which are laterally separated and focused in axially separated planes perpendicular to said light beams and presented to a single eye of a patient wherein said lens means comprises a first, second and third lens, a face plate and a lens housing, said first and second lens being disposed in said face plate such that their axes lie in the same plane, said third lens being disposed in said lens housing which is rotatably mounted on said face plate so that it may be positioned in at least a first and second position wherein said third lens may be aligned with said first or said second lens whereby the combinations provide correcting spherical and cross cylinder lenses.

2. A dual image refraction testing device as set forth in claim 1 wherein said face plate and lens housing have indicia thereon for representing the lens combination through which said light is passing to produce said first and second image outputs; said indicia comprising red and white dots, said red dots being used to represent minus sphere and minus axis; said white dots being used to represent plus sphere and plus axis whereby the particular lens combination is immediately apparent from visual inspection of said indicia.

3. A dual image refraction testing device as set forth in claim 1 to further comprise a housing, a back plate, first and second cylindrical tubular members; a housing for spacially positioning said reflective means and said lens means; a back plate having an opening therethrough affixed to said housing, said back plate having a plurality of depressions on a first side thereof; a first cylindrical tubular member rotatably disposed about a second cylindrical tubular member; said second member being affixed to said back plate at a first end and having an annular flange at a second end, said first member being axially disposed between said flange and said back plate; a plunger and spring assembly disposed within said first tubular member whereby said plunger is forced against said back plate by said spring, said plunger and said depressions mating to denote the angular position between said housing and said second member.

4. A dual image refraction testing device as set forth in claim 3 wherein said first cylindrical tubular member has a first diameter dimension along a first portion of its length and a second diameter dimension along a second portion of its length whereby said member may be easily mated with a phoroptor.

5. A dual image refraction testing device as set forth in claim 2 wherein said first lens is a true Jackson cross cylinder, said second lens is a spherical lens and said third lens is such that it in combination with said first lens results in a spherical lens and it in combination with said second lens results in a Jackson cross cylinder.

6. A dual image refraction testing device as set forth in claim 5 in combination with a phoroptor, said first and second image outputs being parallel when entering said phoroptor, said phoroptor bringing said first image output to focus immediately before the retina of a patient's eye and said second image output to focus immediately after the retina of a patient's eye, said first and second focused images lying within the same plane.

* * * * *